United States Patent [19]

Matsumura et al.

[11] 4,426,129
[45] Jan. 17, 1984

[54] OPTICAL FIBER AND METHOD OF PRODUCING THE SAME

[75] Inventors: Hiroyoshi Matsumura, Saitama; Toshio Katsuyama, Hachiouji; Tsuneo Suganuma, Tokorozawa, all of Japan

[73] Assignee: Hitachi, Ltd., Tokyo, Japan

[21] Appl. No.: 223,747

[22] Filed: Jan. 9, 1981

[30] Foreign Application Priority Data

Jan. 11, 1980 [JP] Japan .................................. 55-1330
Mar. 7, 1980 [JP] Japan .................................. 55-28149
Aug. 18, 1980 [JP] Japan .................................. 55-112741

[51] Int. Cl.³ .................... G02B 5/14; C03B 19/00
[52] U.S. Cl. .................. 350/96.33; 65/3.11; 65/3.12; 350/96.34
[58] Field of Search ............. 65/3.11, 3.12, 3.2; 427/163; 350/96.31, 96.33, 96.34

[56] References Cited

U.S. PATENT DOCUMENTS

| 4,106,847 | 8/1978 | Arnaud ............................. 350/96.31 |
| 4,154,591 | 3/1979 | French et al. ..................... 65/3.11 |
| 4,179,189 | 12/1979 | Kaminow et al. ................. 350/96.33 |
| 4,184,859 | 1/1980 | Maklad ............................. 65/3.12 X |
| 4,274,854 | 6/1981 | Pleibel et al. .................... 65/3.11 X |
| 4,326,869 | 4/1982 | Kurosaki et al. ................. 65/3.11 X |
| 4,341,441 | 7/1982 | Lighty et al. ..................... 65/3.12 X |

FOREIGN PATENT DOCUMENTS 2625010  12/1976 Fed. Rep. of Germany ....... 65/3.12

OTHER PUBLICATIONS

Ramaswamy et al., "Polarization Characteristics of Noncircular Core Single-Mode Fibers, " Applied Optics, vol. 17, No. 18, Sep. 15, 1978, pp. 3014–3017.
Kaminow et al., "Strain Birefringence In . . . Optical Fibres" Electronic Letters, vol. 15, No. 21, Sep. 13, 1979, pp. 677–679.

*Primary Examiner*—Richard V. Fisher
*Attorney, Agent, or Firm*—Antonelli, Terry & Wands

[57] ABSTRACT

A glass layer is formed inside a silica glass tube and another glass layer having a refractive index higher than that of the abovementioned glass layer is formed on said glass layer. After these glass layers are formed, one end of the glass tube is collapsed. While the internal pressure of the glass tube is being reduced below the atmospheric pressure, the glass tube is caused to collapse by heating, thereby yielding a preform for an optical fiber. The optical fiber produced from this preform has the difference in the refractive indices of the two orthogonal major axes of at least $1.6 \times 10^{-4}$ and maintains the linear polarization plane.

12 Claims, 21 Drawing Figures

OPTICAL FIBER AND METHOD OF PRODUCING THE SAME

BACKGROUND OF THE INVENTION (1) Field of the Invention

This invention relates to an optical fiber, especially to an optical fiber for propagating an optical wave using a linearly polarized optical wave, and also to a method of producing such an optical fiber.

(2) Description of the Prior Art

Along with the progress in development of optical fibers, steady development has been made to realize optical circuits such as an isolator, a switching circuit mixer and the like by means of an optical integrated circuit. A waveguide structure used in the optical integrated circuit is fundamentally of a slab type. To realize the switching circuit by the optical integrated circuit, the waveguide must be formed in the slab structure, too, for the necessity of polarizing the light. It is desired in the art to effectively combine such an integrated circuit with other optical devices by use of the optical fiber, but in such a case, the optical fiber must be capable of maintaining the polarization plane in a specific direction.

Further, there have been made various proposals to carry out a variety of measurements by making use of the polarization plane of the light. To realize such measurement, a critical problem to be solved is to transmit the light while maintaining its linear polarization. It would be desirable both from the viewpoints of transmission efficiency and production technique if transmission of the light could be made while maintaining the linear polarization by use of a circular optical waveguide or optical fiber that has now reached the stage of practical use.

To meet the abovementioned requirement, there has been proposed a circular waveguide which forms an optical fiber using a fibrous single crystal consisting of a specific, optically anisotropic material, and of which the refractive index distribution in its section enables single mode transmission but allows the light to leak outside thereby to prohibit the transmission in the orthogonal direction (Japanese Patent Laid-Open No. 60534/1676 entitled "Optical Waveguide", laid-open on May 26, 1976.

However, the optical waveguide disclosed in the abovementioned proposal allows the light to leak in one direction so that the transmission loss is great and a material having optical anisotropy must be employed. Accordingly, this proposal is not free from the drawbacks of large transmission loss, extremely unstable temperature characteristics and severe restrictions imposed on its production.

Meanwhile, it is known theoretically that in order to maintain the polarization plane in the single mode transmission optical fiber, it is effective to increase the difference between the propagation constants of the two orthogonal polarizations (hereinafter referred to as "$\Delta\beta$") lest rotation of the polarization plane occur inside the optical fiber ("Polarization characteristic of non-circular core single-mode fibers", V. Ramaswamy, W. G. French and R. D. Standley, Applied Optics, Vol. 17, No. 18, 1978).

Furthermore, there is known an optical fiber which controls the concentration of a dopant contained in a cladding of the optical fiber consisting of a core, said cladding and a jacketing and utilizes the difference of birefringence occurring due to the difference of thermal expansion of the materials forming the layers, in order to increase the difference in the propagation constants $\Delta\beta$ in the directions of two axes orthogonal to each other (ELECTRONIC LETTERS, I. P. Kaminow, J. R. Simpson, H. M. Presby, J. B. Maccheshey, "Strain birefringence in single-polarization germanosilicate optical fibers", Electronic Letters, Vol. 15, No. 21, pp. 677-679, and Japanese Patent Laid-Open No. 130044/1979 entitled "Optical Waveguide and Method of Producing the Same", laid-open on Oct. 9, 1979.)

Though the optical waveguide disclosed in this proposal is effective, the following problems are encountered in producing the device using a circular waveguide. First, it is difficult to make birefringence at least $10^{-5}$. Since the cladding layer is shaped in an oval form, specific cutting work must be applied to a preform (a glass rod before the production of a thin, final optical fiber by wire drawing) at a certain step of the production process. Furthermore, the core diameter must be reduced markedly down to 1 $\mu$m or below. Finally, the difference in the propagation constants $\Delta\beta$, that is necessary for the practical use, cannot be obtained.

SUMMARY OF THE INVENTION

It is therefore an object of the present invention to realize a single mode fiber which is easy to produce and is capable of sufficiently maintaining the polarization plane against perturbation.

It is another object of the present invention to realize an optical fiber which is highly capable of maintaining the polarization plane and has small transmission loss.

It is still another object of the present invention to realize a method of producing in a simple manner an optical fiber which is highly capable of maintaining the polarization plane by applying some modifications to the conventional method of producing the optical fiber.

To accomplish the abovementioned objects, in a method of producing an optical fiber, the present invention is characterized in that a preform rod for the production of the optical fiber is produced in the manner described below. Namely, the method of the present invention comprises the steps of forming a glass layer on an inner wall of a circular glass tube substrate of a glass material different from the glass layer; collapsing one end of the resulting glass tube by heating; and reducing the internal pressure of the glass tube having one end collapsed in the abovementioned manner to a level lower than the atmospheric pressure and moving the heating from the one collapsed end to form a solid preform while rotating the glass tube, thereby forming an elliptical layer inside the solid preform rod.

In accordance with the method of producing the optical fiber in the present invention, it is possible to produce an optical fiber capable of highly maintaining the polarization plane in the same way as the conventional method except that the internal pressure of the glass tube is reduced below the atmospheric pressure during the production step of the solid preform rod.

In an optical fiber including a jacketing layer, a cladding layer containing $B_2O_3$ as a dopant and a core layer having a refractive index higher than that of the cladding layer, the characteristic feature of the optical fiber in accordance with the present invention resides in that the birefringence is greater than $1.6 \times 10^{-4}$.

The optical fiber in accordance with the present invention comprises a circular optical waveguide consisting of a core layer and a cladding layer and first and second jacketing layers formed sequentially on the circular optical waveguide, whereby the first jacketing layer has an elliptical outer circumference while the second jacketing layer has a circular outer circumference. Preferably, the refractive index of the second jacketing layer is not lower than that of the cladding layer; the core layer is formed by silica glass containing at least one of $P_2O_5$ and $GeO_2$; the cladding layer is formed by silica glass not containing a dopant; and the first jacketing layer contains $B_2O_3$ and further a dopant which increases the refractive index such as $GeO_2$ or $P_2O_5$, for example. In accordance with the optical fiber of the invention, there can be obtained such advantages that the optical fiber maintains the polarization plane and the transmission loss is extremely low.

These and other objects and features of the present invention will become more apparent from the following description to be read in conjunction with the accompanying drawings.

BRIEF DESCRIPTION OF THE DRAWINGS

FIG. 8a is a sectional view of the optical fiber, the drawing being useful for explaining the relationship between the ellipticity of each of the core and cladding layers and the coupling length while

DETAILED DESCRIPTION OF THE PREFERRED EMBODIMENTS

In order to facilitate the understanding of the present invention, the principle of the maintaining operation of the polarization plane by the optical fiber and the constituent factors associated with the maintenance of the polarization plane will be described before the embodiments of the present invention.

Figure 1:
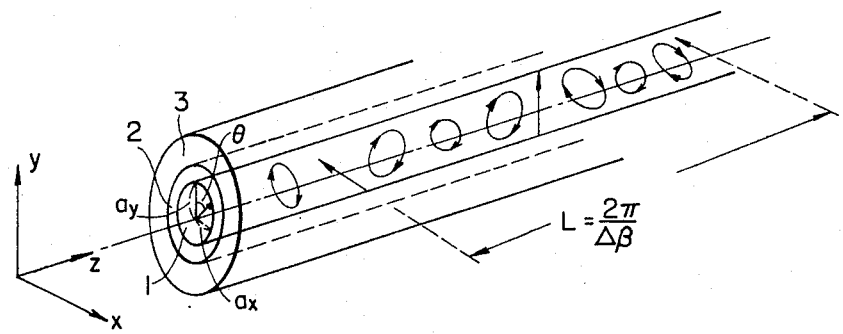
FIGS. 1 and 2 are a perspective view and sectional view of a part of the optical fiber, respectively, the drawings being useful for explaining the principle of maintenance of the polarization plane by the optical fiber.
Figure 2:
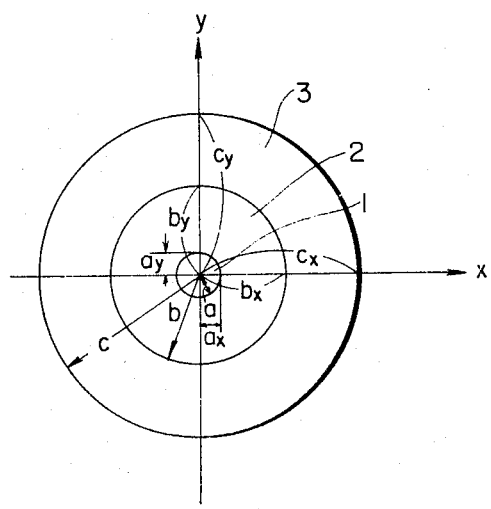

FIGS. 1 and 2 are a partial perspective view and a sectional view, respectively, of the optical fiber that are useful for explaining the principle of operation of the optical fiber maintaining the polarization plane. The optical fiber consists of the core 1, the cladding layer 2 having a refractive index $n_c$ which is lower than that of the core 1, and the jacketing layer 3. The constituents that are associated with the characteristics of the optical waveguide are the core 1 and the cladding layer 2, and the jacketing layer 3 is used for the sake of convenience of the production and for maintaining the mechanical strength of the optical fiber. The refractive index of the core has $n_x$ and $n_y$ in the x and y directions (direction of the principal axis) crossing perpendicularly each other, respectively.

When a polarized ray of light is injected at a predetermined angle $\theta$ with respect to the principal axis y while the optical fiber is kept straight, the polarization plane propagates while rotating in the circular polarization, the elliptical polarization and the linear polarization as indicated by an arrow in the drawings. This can be readily confirmed as the intensity of the light when the light is transmitted by a single mode fiber and is observed from a predetermined direction. When the ray of light polarized in parallel with the principal axes x and y is injected, the polarization plane propagates while in conformity with the principal axes. In other words, the polarization plane is maintained. When the optical fiber is bent or the section changes along the direction of the fiber, however, the energy of the polarized wave (principal polarized wave) along one of the principal axes is converted (mode conversion) to the other principal polarized wave whereby the polarization plane cannot be maintained. Occurrence of this energy conversion becomes maximum when perturbation (such as a random bend distribution in the axial direction, for example) contains a Fourier component having a frequency of $L = 2\pi/\Delta\beta$ (hereinafter referred to as "coupling length" or "beat length") in the axial direction. In other words, when the perturbation of the fiber has only such components that are greater than L, mode conversion is so small as to be negligible. Accordingly, the greater the difference in the propagation constants $\Delta\beta$, the greater the maintenance of the polarized plane.

Next, the relation between the difference in the propagation constants $\Delta\beta$ and the difference in the refractive indices $n_x - n_y$ in the orthogonal direction will be described.

First, an optical fiber consisting of a core 1 of a radius a, a cladding 2 of a radius b and a jacketing 3 of a radius c will be considered. It will be assumed that the thermal expansion coefficient is $\alpha_1$ for each of the core 1 and the jacketing 3 and is $\alpha_2$ for the cladding 2, and that the Young's modulus E and the Poisson's ratio $\nu$ are the same for each of the core material, cladding material and jacketing material. When the preform having the aforementioned construction (a glass rod before wire drawing) is softened by heating at a high temperature, stress becomes substantially zero during heating. When the optical fiber is finished after wire drawing and is then cooled down to atmospheric temperature, the refractive index $n_c$ of the core 1 in the radial direction can be expressed as follows with $\Delta T$ representing the difference between the softening point and atmospheric temperature:

$$n_c = n_1 + \{(b/a)^2 - 1\}E(\alpha_2 - \alpha_1)$$
$$\Delta T(P + 3Q)/\{2(1-\nu)c^2/a^2\}(1)$$

where $n_1$ is the refractive index of the core material when no stress is present, and P and Q each are the stress-optics coefficient of the core material.

When both core and cladding are not circles (not perfectly circular), the difference in the refractive indices between the x axis $n_x$ and the y axis $n_y$ of the core can be expressed as follows:

$$n_x - n_y = \frac{E(\alpha_2 - \alpha_1)}{2(1-\nu)c^2}(P + 3Q) \quad (2)$$

$$\{(b_x^2 - b_y^2) - (a_x^2 - a_y^2)\}$$

where $a_x$ and $a_y$ are core diameters in the x and y directions, respectively, and $b_x$ and $b_y$ directions, respectively. Here, examination will be made using definite numerical values. In glass consisting principally of $SiO_2$, E=0.6 Mbar, P=−0.05 Mbar$^{-1}$, Q=−0.3 Mbar$^{-1}$ and $\nu$=0.2. Hence, $E(P+3Q)/(1-\nu) \approx -0.7$. Accordingly, $\Delta T$ may be set to 1,500° C.

Figure 3:
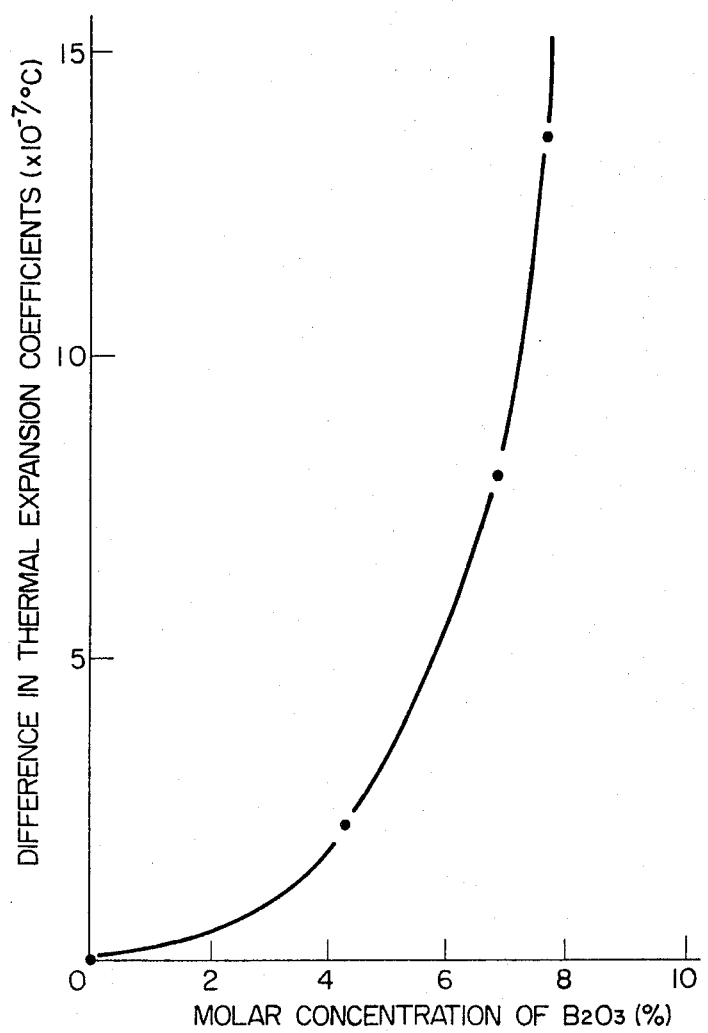
FIG. 3 is a diagram showing the relationship between a molar concentration of $B_2O_3$ and the difference in the thermal expansion coefficients.

When the difference between the thermal expansion coefficient $\alpha_2$ of $SiO_2$ glass mixed with $B_2O_3$ and that $\alpha_1$ of $SiO_2$ glass is experimentally measured in a range from room temperature to 400° C., the result with respect to the $B_2O_3$ concentration is obtained as illustrated in FIG. 3. It can be seen from the result that the difference in the thermal expansion coefficients $(\alpha_2 - \alpha_1)$ is not linearly proportional to the $B_2O_3$ concentration but contains a higher term of the concentration. This difference is generally given by the following equation:

$$\alpha_2 - \alpha_1 = A(M_{B_2O_3})^k \quad \ldots (3)$$

where A is a proportional constant, k is a power factor (k>1) and $M_{B_2O_3}$ is a molar concentration of $B_2O_3$.

Accordingly, the aformentioned equation (2) becomes as follows:

$$n_x - n_y = -0.36A(M_{B_2O_3})^k$$

$$\left[\frac{(b_x^2 - b_y^2) - (a_x^2 - a_y^2)}{c^2}\right] \quad (4)$$

In order to make the difference in the refractive indices a predetermined value, the $B_2O_3$ concentration and the ellipticity may as well be changed. Here, the power factor k cannot be obtained from FIG. 3 when the $B_2O_3$ concentration is high, and becomes as large as 4 to 8 as will be shown in the later-appearing FIG. 7.

On the other hand, if the core diameter (a) of the optical fiber is much greater than $\lambda$ which represents the wavelength of the light, the difference in the propagation constants $\Delta\beta$ is approximately expressed as follows:

$$\Delta\beta = 2\pi/\lambda(n_x - n_y).$$

In order to obtain an optical fiber having a large value for the abovementioned $(n_x - n_y)$, the present invention obtains the preform rod, which is necessary for the production of the optical fiber, in the following manner. Namely, the outer circumference of at least one of the core layer, the cladding layer and the jacketing layer is made elliptical so as to obtain an effectively large difference in the refractive indices $n_x - n_y$.

In forming a glass thin film as a principal portion for the transmission of the light on the inner wall of a substrate glass tube such as a silica tube by the core or the core and cladding or jacketing layer and preparing the solid glass rod or the preform by heat-fusing the tube, the present invention first heats a part of the glass tube provided with the abovementioned glass film in such a manner that the part collapses and changes into a solid tube, and then gradually moving the heating point of the solid portion while reducing the internal pressure of the tube from the other open end at a predetermined degree of vacuum (or, to a level below atmospheric pressure), thereby forming the preform rod. The resulting preform rod is subjected to wire drawing into the thin optical fiber as the final product. In practising the abovementioned production method of the optical fiber, it is desirable to rotate the glass tube for the purpose of causing one part of the glass tube to collapse while the heating point is being moved and the internal pressure of the glass tube is being reduced.

According to the present invention, mere addition of the step of reducing the internal pressure of the glass tube to the heretofore known production method of the optical fiber makes it possible to obtain the optical fiber having constant major and minor axes for its elliptical portion, without relying upon other specific steps in particular. If the materials, the degree of vacuum and the dimension in the radial direction are stipulated, the optical fibers having the core or the cladding of the same ellipticity can be reliably reproduced.

Figure 4:
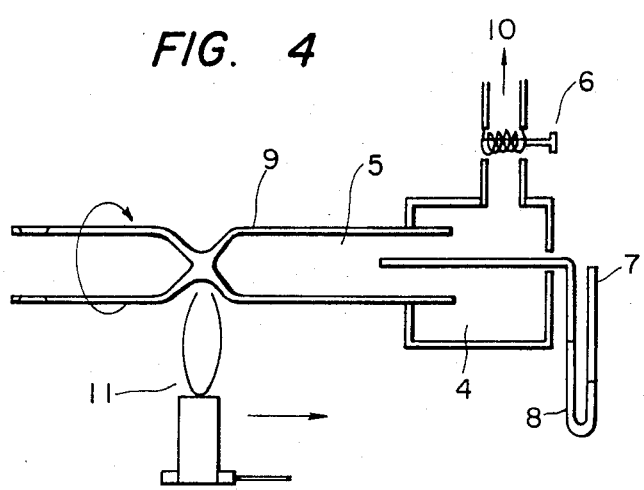
FIG. 4 is a schematic view showing a part of the production steps of the optical fiber in accordance with the present invention.

FIG. 4 is a schematic view which is useful for explaining the step of producing the preform in the method of producing the optical fiber of the present invention. Prior to this step, a silica tube is heated to increase its thickness and to decrease its radius in the same manner as in the conventional production method of the optical fiber.

The radius of the silica tube is reduced while its thickness is increased in order to prevent the deviation of the axes of the ellipse because the axes would deviate if the tube used for producing the preform is thin and has a large diameter.

After the diameter is reduced in the abovementioned manner, the glass film is formed on the inner wall of the tube by a heretofore known chemical vapor deposition method. Both ends of the glass tube thus formed are fitted to a glass lathe. Though the lathe is not shown in FIG. 4, a part of the tube 9 thus fitted (end portion of the glass tube) is collapsed by heating with an oxyhydrogen burner. An exhaust tank 4 is fitted to the open portion at the other end of the glass tube and the air inside the tube is exhausted from an exhaust tube 10 while adjusting a control valve 6 for exhausting until the internal pressure becomes constant. The degree of vacuum is measured by means of the difference in the levels of a liquid 8 placed in a U-shaped tube having one end thereof inserted into the silica tube 5. Incidentally, the internal pressure of the silica tube may be reduced at the time when one end portion of the glass tube is first collapsed.

While the silica tube is being rotated at a predetermined speed in the abovementioned manner, the oxyhydrogen burner 11 is gradually moved whereby there is formed the solid preform.

Figure 5A:
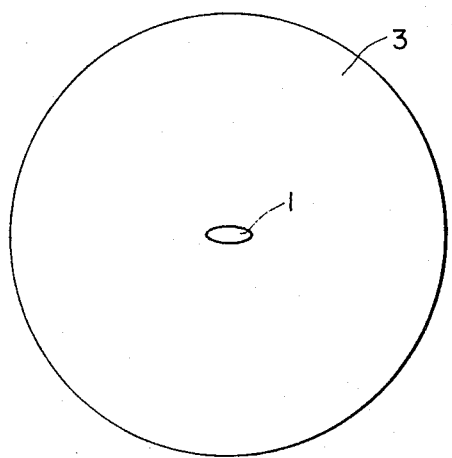
FIGS. 5(a)-5(d) are sectional views of the optical fibers produced in accordance with the production method of the present invention.

FIGS. 5(a), (b), (c) and (d) are sectional views drawn by tracing the photos of the sections of the preforms produced in accordance with the present invention. The production condition of each preform is as follows.

The original silica tube has an outer diameter of 20 mm and a thickness of 1.5 mm for each of the preforms. The speed of rotation of the silica tube during the production of the preform is 50 r.p.m. and the moving speed of the burner 0.17 mm/sec.

Figure 5B:
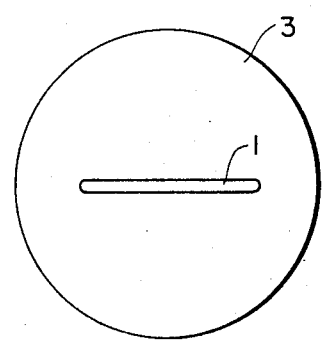
Figure 5C:
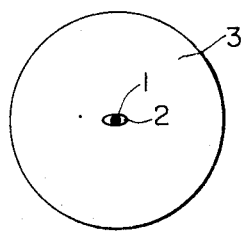
Figure 5D:
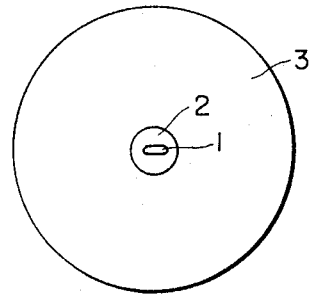

FIG. 5(a) uses silica glass doped with germanium as the core and the degree of vacuum is 9 mm water height. Ellipticity of about 50% is obtained. FIG. 5(b) increases the degree of vacuum up to 27 mm and the thickness of the germanium layer doped into the preform core is as thick as about 15 μm. FIGS. 5(c) and 5(d) use silica glass in which silica glass is used for the core and silica glass doped with $B_2O_3$ for the cladding. In FIG. 5(c), the core is circular and the cladding is elliptical whereas in FIG. 5(d), the core is elliptical and the cladding is circular. In order to make the outer circumference of the center layer (core) circular and that of the intermediate layer elliptical, it is necessary that the softening point of the material of the intermediate layer is lower than that of the material of the outermost layer (jacketing) and the softening point of the material of the center layer is higher than that of the intermediate layer. Generally speaking, the silica glass doped with $B_2O_3$ has a softening point lower than that of the silica glass not doped with a dopant and that of the silica glass doped with a small amount of $GeO_2$ or $P_2O_3$.

As the method of producing the abovementioned preforms, the starting silica tube is caused to shrink to some extent in such a manner that the axes of the ellipse do not rotate, and the quantity of this shrinkage and the thickness of each of the core and cladding layers are suitably selected.

When these preforms are subjected to wire drawing under heating, the center portion remains virtually in a similar shape while only the outer circumference somewhat changes so as to approach the circle, and the ellipticity of the outer circumference is at most within 1 to 2% and hence, is virtually circular.

Figure 6:
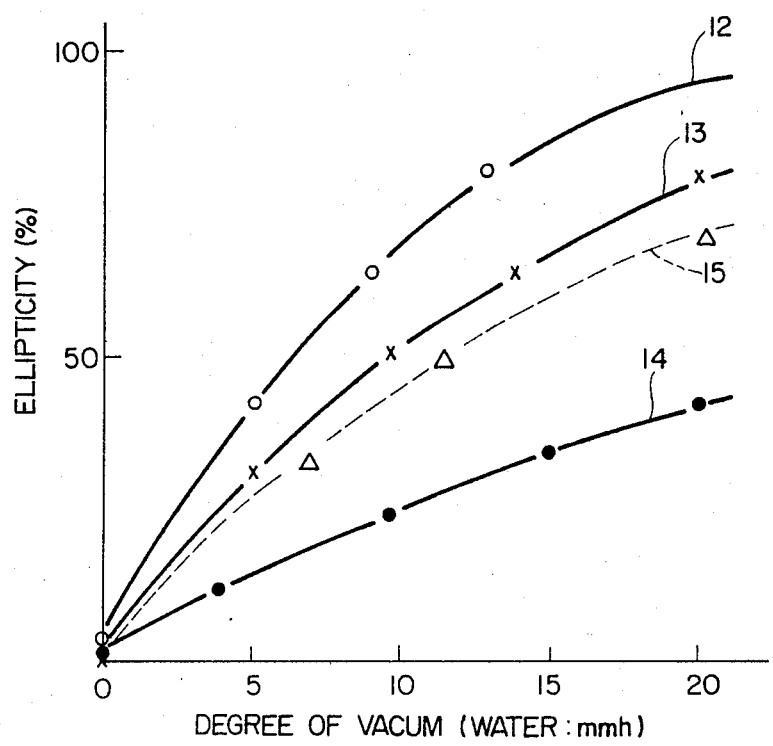
FIG. 6 is a diagram showing the relationship between the ellipticity of the core or cladding layer of the optical fiber produced in accordance with the method of the present invention and the degree of vacuum.

FIG. 6 is a diagram which shows the measurement result of the change in the ellipticity when the thickness of the silica tube and the degree of vacuum are changed. The condition for each curve is as follows. The curves 12, 13 and 14 represent the case in which the silica glass doped with germanium is used as the core and having the double-layered construction such as shown in FIGS. 5(a) and 5(b) is employed. The germanium concentration is about 15 mol%. The starting silica tube has an outer diameter of 20 mm and an inner diameter of 17 mm for each curve, and the thickness of the germanium layer of the solid preform is about 10 μm. Before these solid preforms are caused to collapse by changing the degree of vacuum, they are caused to shrink to the outer diameters of 13.5 mm, 12.8 mm and 9.7 mm, respectively, and then the pressure is reduced. The curves represent the ellipticity of the resulting solid preforms, respectively. Namely, the curves 12, 13 and 14 represent the cases where the thickness of the silica tubes are 13.5 mm, 12.8 mm and 9.7 mm, respectively. The curve 15 represents the optical fiber which uses silica for the core and boron-doped silica glass for the cladding and which has a three-layered construction such as shown in FIGS. 5(c) and 5(d). Boron is doped in about 12 mol% and the cladding has a thickness of 18 μm in the substrate tube. The silica layer as the core has a thickness of about 8 μm, and the starting silica tube has an outer diameter of 20 mm and an inner diameter of 17 mm in the same way as the abovementioned silica tube. After the cladding layer and the core layer are produced on this tube, the tube is caused to shrink to about 13.1 mm. Thereafter, the tube is caused to collapse by changing the degree of vacuum, and the ellipticity of the resulting cladding layer is expressed in terms of a function of the degree of vacuum. This is represented by the curve 15. In this case, the core is somewhat elliptical and has ellipticity of 4.2% on the average.

Figure 7:
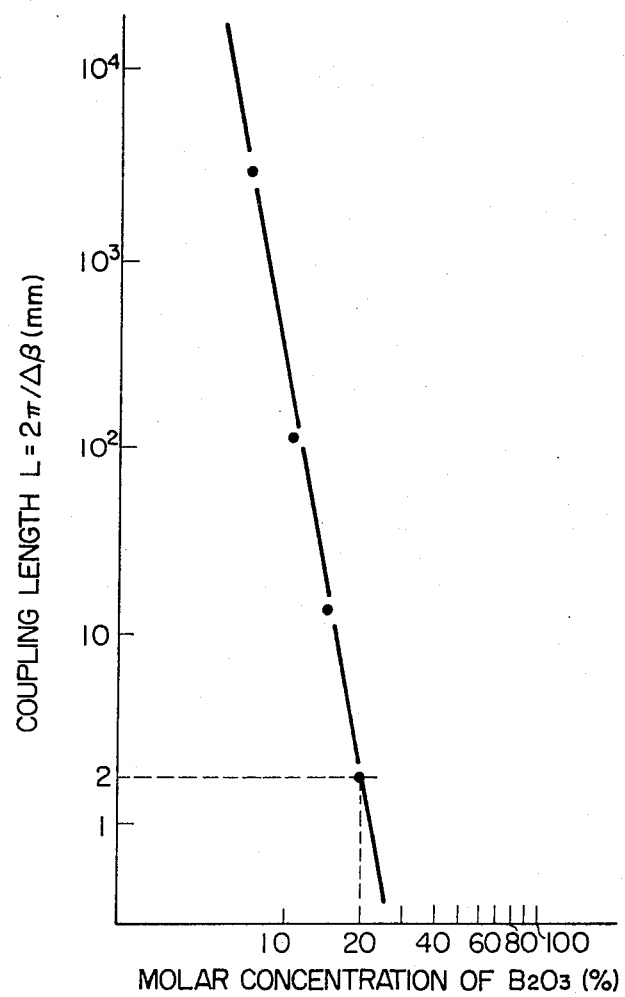
FIG. 7 is a diagram showing the relationship between the molar concentration of $B_2O_3$ contained in the cladding layer of the optical fiber and the binding length.

FIG. 7 shows the results of the actual measurement of the relationship between the $B_2O_3$ concentration (mol%) as the dopant and the coupling length $L=2\pi/\Delta\beta$ in single mode fibers using $SiO_2$ for the jacketing layer 3, $SiO_2$ and $B_2O_3$ as the dopant for the cladding layer 2 and $SiO_2$ for the core layer 1. Each optical fiber is produced in the following manner.

Onto the inner wall of a silica tube having an outer diameter of 14 mmφ and an inner diameter of 12 mmφ are formed, by a chemical vapor deposition method, first $SiO_2+B_2O_3$ glass using $SiCl_4$ and $BBr_3$ as the starting materials and then $SiO_2$ glass. The hole is caused to collapse at a high temperature of about 1,900° C. to prepare a solid preform. The shape and $B_2O_3$ molar concentration of each preform are illustrated below.

| Preform No. | $B_2O_3$ Concentration (%) | Relative refractive index difference between core and cladding Δ (%) | Core diameter 2d (mm) | Cladding diameter (mm) | Preform outer diameter 2D (mm) |
|---|---|---|---|---|---|
| 1 | 10.1 | 0.34 | 0.39 | 4.5 | 8.1 |
| 2 | 14.5 | 0.49 | 0.39 | 4.5 | 8.0 |
| 3 | 19.9 | 0.65 | 0.40 | 4.6 | 8.1 |
| 4 | 28.0 | 0.81 | 0.30 | 3.9 | 7.1 |

When the cladding ellipticity is defined as $(b_y-b_x)/(b_y+b_x)$, the three kinds of preforms, i.e. Nos. 1 through 3, have the cladding ellipticity of about 15% and when the core ellipticity is defined as $(a_y-a_x)/(a_y+a_x)$, they have the core ellipticity of about 6.3%. The preform No. 4 has the core and the cladding that are substantially circular (ellipticity of about 1%) but the core is eccentric by about 20%. Each of these preforms is wire-drawn at a high temperature of about 2,000°C. so that its drawing ratio (h) satisfies the following equation to produce a single mode optical fiber:

$$h=\{d\cdot 2\pi n_1 \sqrt{2\Delta}/(\lambda\cdot 2.405)\}^2$$

where $n_1=1.46$, $\lambda=0.633$ μm. When the coupling length L of each optical fiber is measured at a wavelength of the light of 0.633 μm, there is obtained the result shown in FIG. 7, in which the abscissa represents the $B_2O_3$ molar concentration and the ordinate the coupling length L. It can be seen that the four measuring points are positioned substantially linearly on a logarithmic scale. At the $B_2O_3$ concentration of 20 mol%, the optical fiber having the coupling length of 2 mm can be obtained. From these measured values, it can be understood that the relation L<2 mm can be satisfied if the $B_2O_3$ concentration is at least 20 mol%. In terms of the birefringence $n_x-n_y=\lambda/L$, this is greater than about $3\times 10^{-4}$.

Figure 8A:
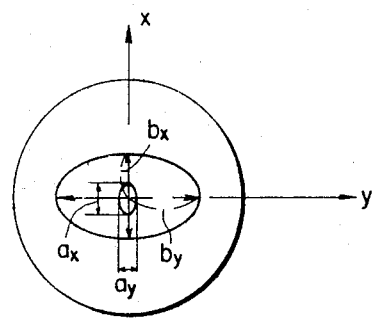
Figure 8B:
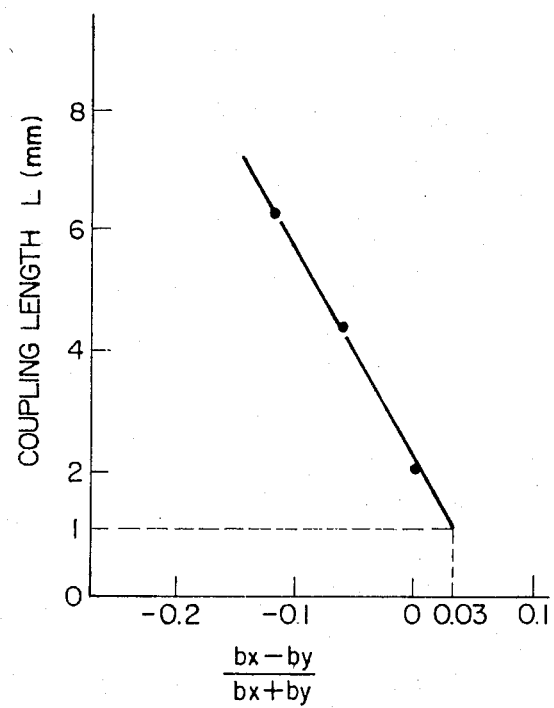
FIG. 8b is a diagram showing the relationship between the ellipticity of each of the core and cladding layers and the coupling length.

FIGS. 8A and 8B are drawings useful for explaining the relationship between the directions of the axes of ellipse of the core, those of the cladding, and the coupling length.

Three kinds of optical fibers are first produced in accordance with the following production method. Using a silica tube having an outer diameter of 14 mm$\phi$ and an inner diameter of 12 mm$\phi$ as the starting material, silica glass doped with 28.0 mol% of $B_2O_3$ using $SiCl_4$ and $BBr_3$ as the starting materials is deposited on the silica tube by a chemical vapor deposition method. One end of the silica tube is sealed and the air is exhausted from the other end to reduce the internal pressure of the tube. Heating is then made at about 1,900° C. to cause the tube to gradually shrink. In accordance with the degree of vacuum, the silica tube changes from a circular shape to an elliptical shape. Shrinkage is continued until the thinner inner diameter of the elliptical silica tube reaches about 600 $\mu$m. Three elliptical tubes of this type are produced. The degree of vacuum and the ellipticity of these tubes are illustrated below.

| Sample No. | Degree of vacuum (mmHg) | Ellipticity |
| --- | --- | --- |
| 1 | 0 | +0.005 |
| 2 | 0.20 | −0.06 |
| 3 | 0.26 | −0.12 |

An elliptical silica rod (having a 500 $\mu$m-long major axis and a 200 $\mu$m-long minor axis) is inserted into each of these silica tubes and wire drawing is then made in a furnace of 2,000° C. by a rod-in-tube method until the major axis and the minor axis of the core become 5.2 $\mu$m and 2.3 $\mu$m, respectively. A He-Ne laser is passed through each tube to confirm that only a single mode is propagated. After wire drawing, the ellipticity of the core and cladding remains substantially unaltered from the abovementioned ellipticity. The coupling length L of each optical fiber is measured at a wavelength 0.633 $\mu$m with the results shown in FIG. 8B. As can be understood from this diagram, it is obvious that the coupling length L increases unless the direction of the major axis of the ellipse of the core coincides with that of the cladding. At the $B_2O_3$ concentration of 23 mol%. L>2 mm if the ellipticity of the cladding is 0.005 or more and L<mm if the ellipticity is at least 0.03. From this, it can be understood that the construction of the optical fiber is preferably such that at least one of the core and the cladding is elliptical and satisfies the relation $(b_x{}^2 - a_x{}^2) < (b_y{}^2 - a_y{}^2)$.

Figure 9:
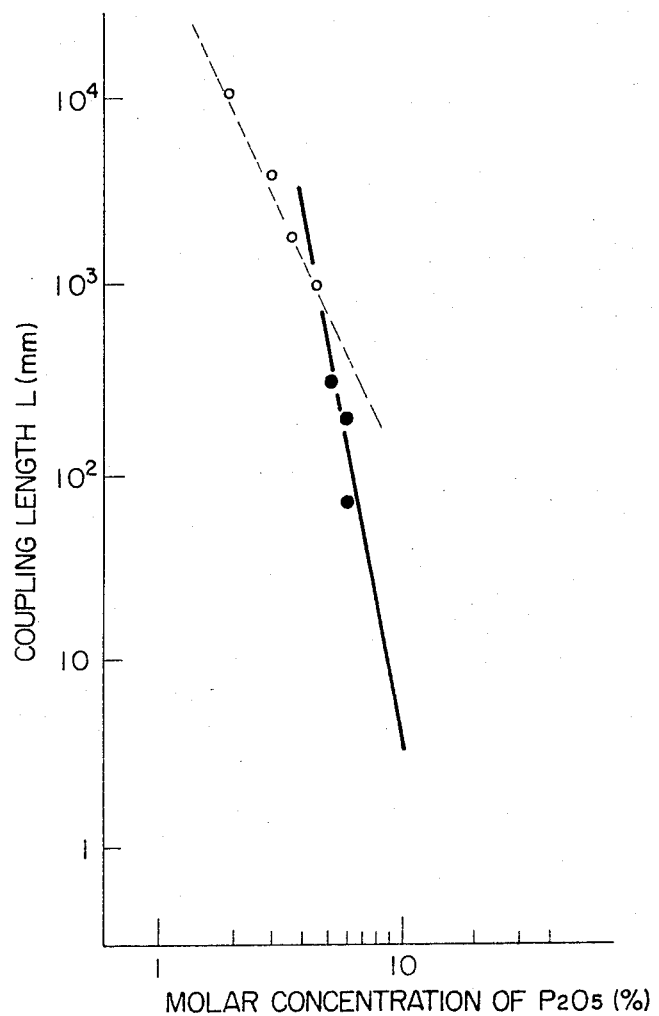
FIG. 9 is a diagram showing the relationship between the molar concentration of $P_2O_5$ and the coupling length.

FIG. 9 shows the influence of the ellipticity of the core upon the binding length. Onto a silica tube having an outer diameter of 14 mm$\phi$ and an inner diameter of 12 mm$\phi$ 2 mol%, 3 mol%, 3.6 mol% and 4.2 mol% of $P_2O_5$ are deposited together with $SiO_2$, respectively, and each tube is then caused to collapse at a temperature of as high as 1,900° C. The resulting preforms are subjected to wire drawing, in an electric furnace held at about 2,000° C., into single mode fibers, respectively. The core of each optical fiber thus produced is not perfectly circular but has ellipticity of 7.1%. The coupling length L of each optical fiber is measured at a wavelength of 0.633 $\mu$m with the result indicated by a white circle in FIG. 9.

Next, the internal pressure of the starting silica tube is reduced to 5.3 mm water height and is then caused to shrink at a high temperature of about 1,900° C. Thus, an elliptical tube is obtained. Onto the inner wall of this elliptical tube are deposited 5 mol%, 6 mol% and 6.5 mol% of $P_2O_5$ together with $SiO_2$ and the tube is then caused to collapse. The resulting preform is subjected to wire drawing to prepare a single mode fiber, which has ellipticity of about 30.2%. The coupling length of the optical fiber is measured with the result indicated by black circles in FIG. 9. It can be seen that the gradient of a line connecting the white circles is obviously different from the gradient of a line connecting the black circles. In other words, it can be understood that the coupling length L can be made small also by rendering the core elliptical.

Hereinafter, examples of the optical fibers of the present invention will be described, said optical fibers realized on the basis of the abovementioned production method and experimental results.

EXAMPLE 1

A silica layer containing about 25 mol% of $B_2O_3$ was deposited onto the inner wall of a silica tube having an outer diameter of 14 mm$\phi$ and a thickness of 1 mm, and only $SiO_2$ was then deposited. The tube was caused to collapse at a high temperature (approx. 1,900° C.) to prepare a preform. The resulting preform was heated to a high temperature (2,100° C.) and was subjected to wire drawing, thereby obtaining a single mode fiber having a core diameter of 5 $\mu$m. The optical fiber had ellipticity of 1.1% for the core and 15% for the cladding. 1 km of this optical fiber was wound onto a drum of a radius of 20 cm and the linear polarization of the laser light of a wavelength of 0.633 $\mu$m was injected in parallel to the principal axes whereby the incident light became linear polarization and its orthogonal polarization component was at least 40 db. When oscillation of a sine wave having a wavelength of about 1.5 mm was applied, the output of about 30 dB was obtained. The coupling length L was 0.95 mm (the birefringence of $6.7 \times 10^{-4}$).

EXAMPLE 2

Figure 10:
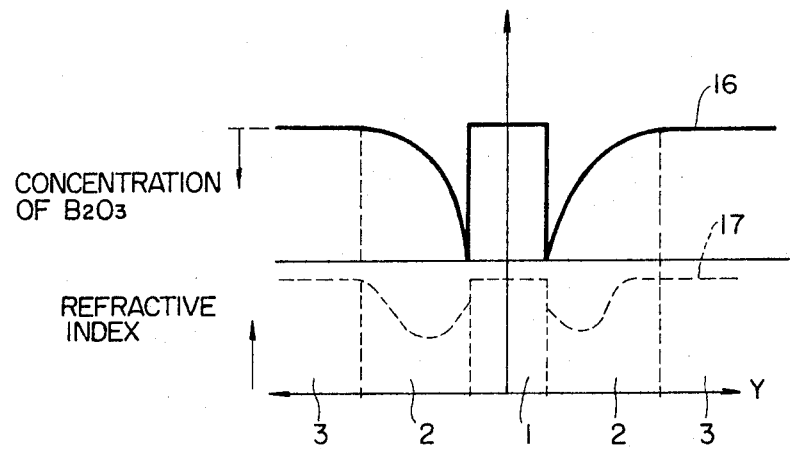
FIGS. 10 and 11 are diagrams, each showing the relationship between the $B_2O_3$ concentration and the distribution of the refractive indices.

FIG. 10 shows the distribution each of the refractive indices in the radial direction, the concentration and the dopant 16 and the change in the refractive indices 17 in the optical fiber in accordance with an embodiment of the present invention. Namely, the core 1 and the jacketing 3 were made of $SiO_2$ and the gradient of concentration of $B_2O_3$ as the dopant for the cladding 2 was gradually changed from 0 on the side of the jacketing 3 towards the core 1 in such a manner that the gradient of concentration became maximum at the boundary between the core 1 and the cladding 2. the $B_2O_3$ concentration to determine the difference in the propagation constant $\Delta\beta$ in this case was the one at the contacting portion with the core 1 that was the maximum value and 30 mol%. When the concentration of $B_2O_3$ as the dopant thus distributed, the relationship between the refractive index and the $B_2O_3$ concentration was such that the refractive index became minimum near the $B_2O_3$ concentration of 20%, thereby providing the distribution of the refractive indices of the optical fiber such as represented by the curve 17.

In accordance with this embodiment, it was possible to mitigate the stress due to the difference in the thermal expansion coefficient between the jacketing 3 and the cladding 2, to prevent damage of the glass and at the same time, to concentrate the stress only upon the proximity of the core. Hence, the stress concentrating upon the core 1 did not break the glass because the core diameter was small. It was also possible to obtain a large difference in the propagation constants $\Delta\beta$ by concentrating the thermal stress upon the core.

The production method of the abovementioned optical fiber was as follows. Onto the inner wall of a silica tube having an outer diameter of 14 mm$\phi$ and a thickness of 1 mm were deposited $SiO_2+B_2O_3$ glass using $SiCl_4$ and $BBr_3$ as the starting materials while changing sequentially the $B_2O_3$ concentration as illustrated below, and thereafter only $SiO_2$ was deposited as the core.

| Deposition No. | SiO$_2$ mol % | B$_2$O$_3$ mol % |
| --- | --- | --- |
| 1–5 | 99.2 | 0.8 |
| 6–9 | 98.4 | 1.6 |
| 10–12 | 97.0 | 3.0 |
| 13–14 | 93.8 | 6.2 |
| 15 | 91.0 | 9.0 |
| 16 | 81.0 | 19.0 |
| 17 | 75.2 | 24.8 |
| 18 | 70.0 | 30.0 |

The tube was caused to collapse at a high temperature (1,900° C.) to prepare a preform and the resulting preform was fused at a high temperature (2,100° C.) to obtain an optical fiber having a core diameter of 3.5 $\mu$m on the average and a cladding diameter of 20 $\mu$m on the average. The cladding of the optical fiber had ellipticity of about 6% and its core, about 2%. The optical fiber became a single mode fiber at a wavelength of 0.633 $\mu$m and its coupling length L was 1.5 mm.

EXAMPLE 3

Figure 11:
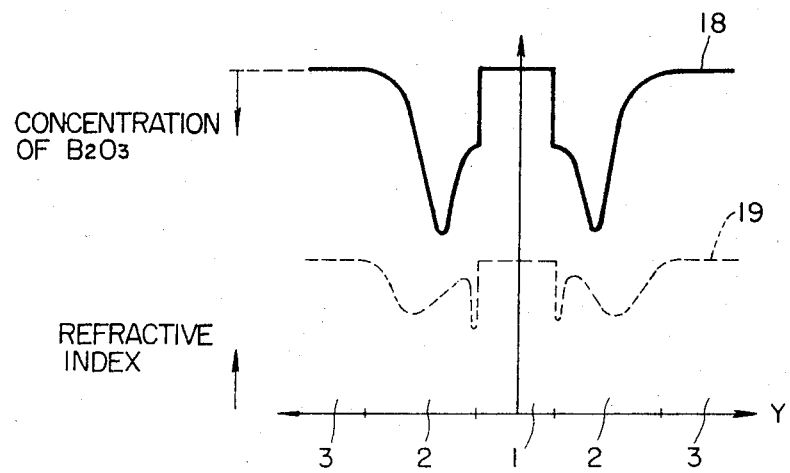

FIG. 11 shows the distribution of the $B_2O_3$ concentration 18 in the radial direction and the distribution of the refractive indices 19 in the optical fiber in accordance with still another embodiment of the present invention, the embodiment contemplating to prevent the damage of the fiber due to the stress of thermal expansion coefficients. The distribution of the concentration of the dopant 18 was made maximum at the center of the cladding 2. The materials and the production method of this optical fiber were substantially the same as those of the optical fiber shown in FIG. 10. To change the dopant ($B_2O_3$) concentration for the cladding 2, $SiO_2+B_2O_3$ was deposited on the silica tube in the following manner. The optical fiber obtained finally had a core diameter of 3.5 $\mu$m and a cladding diameter of 22 $\mu$m and formed a single mode fiber for the light of a wavelength of 0.633 $\mu$m and its coupling length L was 2 mm (birefringence=$3.2\times10^{-4}$).

| Deposition No. | SiO$_2$ mol % | B$_2$O$_3$ mol % |
| --- | --- | --- |
| 1–5 | 99.2 | 0.8 |
| 6–8 | 98.4 | 1.6 |
| 9–10 | 97.0 | 3.0 |
| 11 | 93.8 | 6.2 |
| 12 | 91.0 | 9.0 |
| 13 | 80.9 | 19.1 |
| 14 | 71.5 | 28.5 |
| 15 | 80.8 | 19.2 |
| 16 | 87.7 | 12.3 |
| 17 | 93.5 | 6.5 |

EXAMPLE 4

On the inner wall of a silica tube having an outer diameter of 14 mm$\phi$ and an inner diameter of 12 mm$\phi$ were sequentially deposited $SiO_2+B_2O_3$ glass, $SiO_2$ glass and $SiO_2+GeO_2$ glass. The conditions of deposition of these glasses were as follows.

| Deposition No. | SiO$_2$ mol % | B$_2$O$_3$ mol % | GeO$_2$ mol % |
| --- | --- | --- | --- |
| 1–5 | 99.2 | 0.8 | 0.0 |
| 6–8 | 98.4 | 1.6 | 0.0 |
| 9–10 | 95.2 | 4.8 | 0.0 |
| 11 | 90.5 | 9.5 | 0.0 |
| 12 | 80.8 | 19.2 | 0.0 |
| 13 | 70.0 | 30.0 | 0.0 |
| 14–15 | 100.0 | 0.0 | 0.0 |
| 16 | 93.8 | 0.0 | 6.2 |

After deposition, the silica tube was caused to collapse at about 1,900° C. in the atmosphere of $GeCl_4$ and was then subjected to wire drawing to prepare an optical fiber.

In the optical fiber thus produced, the core diameter was 4.2 $\mu$m$\phi$ and the $SiO_2+GeO_2$ glass region at the center was 1.2 $\mu$m$\phi$. The coupling length ($L=2\pi/\Delta\beta$) of this optical fiber was about 1 mm at a wavelength of 0.83 $\mu$m (birefringence=$8.3\times10^{-4}$). Thus, there was obtained the optical fiber that had maintained the linear polarization plane for practical application.

EXAMPLE 5

In the same way as in Example 4, an optical fiber consisting of a cladding of $SiO_2+B_2O_3$ glass, a core of $SiO_2$ glass and the center region of $SiO_2+B_2O_3$ glass was produced. The conditions for deposition were the same as in Example 1 with the exception that the final center region consisted of a glass layer of 70.0 mol% of $SiO_2$ and 30 mol% of $B_2O_3$. Collapsing was effected in the atmosphere of $BBr_3$. The resulting optical fiber had a core diameter of 5 $\mu$m$\phi$ and the $SiO_2+B_2O_3$ glass region at the center of 1.6 $\mu$m$\phi$. Upon measurement, the optical fiber was found to have a coupling length of 1.0 mm at a wavelength of 0.83 $\mu$m.

In the embodiments of Examples 4 and 5, the dopant was further added to the center portion of the core. Since the stress due to the thermal expansion acts in the reverse direction upon the interface between the region having a high dopant concentration and the region having a low dopant concentration of the core, these embodiments provide the effect of increasing the difference in the refractive indices in the orthogonal direction. Incidentally, the dopant to be applied to the center region may be $B_2O_3$ or the like that reduces the refractive index, or $GeO_2$. $P_2O_5$ or the like that increases the refractive index. These embodiments provide an optical fiber having a coupling length of 4 mm (birefringence=$1.6\times10^{-4}$).

Figure 12:
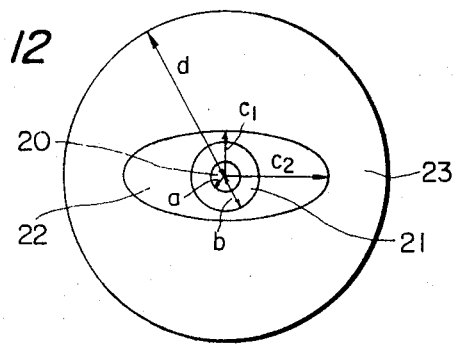
FIG. 12 is a sectional view of the optical fiber in accordance with the present invention.

FIG. 12 shows a section of the optical fiber in accordance with still another embodiment of the present invention. In the foregoing embodiments, $B_2O_3$ was doped into the cladding forming the optical fiber in order to increase the birefringence of the core. However, these embodiments have the disadvantage that though they can maintain the linear polarization plane, the transmission loss is great because the light energy transmitted leaks into the cladding layer, too. In an optical fiber consisting of a core 20 and a cladding 21 (hereinafter referred to as an "optical waveguide" in order to differentiate it from the foregoing optical fibers), this embodiment sequentially forms first and second jacketing layers 22 and 23 around the outer circumference of the optical waveguide.

As shown in the drawing, the optical waveguide includes the core 20 consisting of circular silica glass containing a small amount of $GeO_2$ and the cladding layer 21 consisting of circular silica glass not doped with a dopant, and the optical waveguide has formed around it the first jacketing layer 22 consisting of elliptical silica glass containing $Be_2O_3$ and $GeO_2$ as the dopants and the second jacketing layer 23 cosisting of silica glass.

The refractive index of each layer is 1.002 n for the core, n for the cladding $SiO_2$, 0.9999 n for the $SiO_2+B_2O_3+GeO_2$ portion of the first jacketing layer and n for the second jacketing layer, with n representing the refractive index of $SiO_2$. The core diameter is 8 μm and the outer diameter of the $SiO_2$ cladding is 20 μm. The length of the minor axis of the first jacketing layer is 35 μm while the length of its major axis is 100 μm. The outer diameter of the second jacketing layer is 150 μm. The coupling length of this optical waveguide is 0.8 mm for the light of a wavelength of 0.633 μm and its transmission loss is as low as 0.3 dB/Km at a wavelength of 1.55 μm.

Though this embodiment uses $GeO_2$ as the dopant in order to increase the refractive index, this dopant may be replaced by $P_2O_5$, or both. Though this optical waveguide has the core and the cladding each having a constant refractive index, it may be a graded core that is generally known in the art. In short, the optical waveguide may as well be an optical fiber for transmitting the light. In order to deprive the second jacketing layer of the function of the waveguide, it is necessary that the refractive index of the second jacketing layer be at least 0.998 times that of the cladding layer of the optical waveguide.

FIGS. 13 through 17 show the results of measurement of parameters that would presumably affect the ellipticity of each layer of the optical fiber in the production method of the optical fiber in the present invention.

Figure 13:
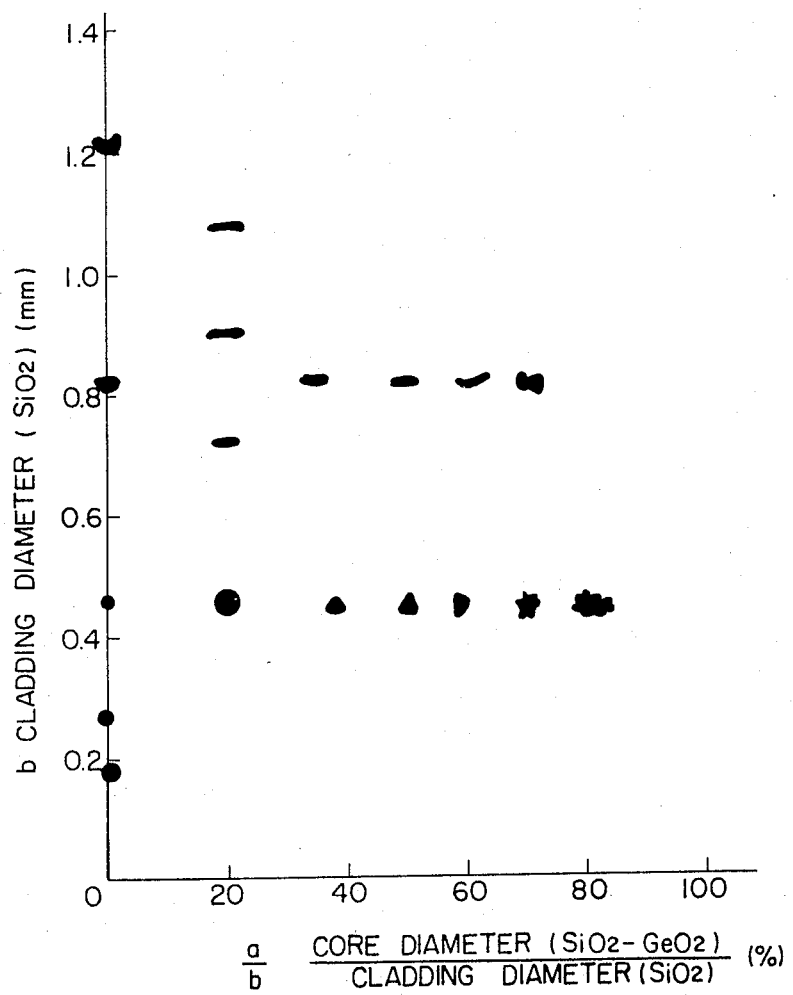
FIGS. 13-17 show the results of measurement of parameters that would presumably affect the ellipticity of each layer of the optical fiber in the production method of the optical fiber of the present invention.

FIG. 13 shows the appearance of the optical waveguide that is produced using the same material for each layer as in the embodiment shown in FIG. 12 but changing the ratio a/b of the radius a of the core 20 to the outer diameter b of the cladding 21.

The conditions for causing the silica tube to collapse after the formation of each layer on the tube are a heating temperature of 1,900° C., a degree of vacuum of −8 mm water height and a moving speed of 0.08 mm/sec. for the heating point. As can be seen from the drawing, the optical waveguide becomes circular within the range of b<0.6 mm and a/b<0.3. If the thickness of the layers corresponding to the core and the cladding before collapse of the tube are $t_1$ and $t_2$, respectively, these relationships are equivalent to the following relationship:

$$t_2/t_1 > 10.1, \quad t_1 + t_2 < 0.18 \cdot 1/C, \text{ mm}$$

where C' is an inner diameter of the silica tube before the core and cladding layers are formed.

These relationships can be satisfied by the heating temperature of 1,800° to 2,100° C., the degree of vacuum of −1 mm to −20 mm water and the moving speed of 0.4 to 0.02 mm/sec. for the heating point as the conditions for causing the collapse of the silica tube.

Figure 14:
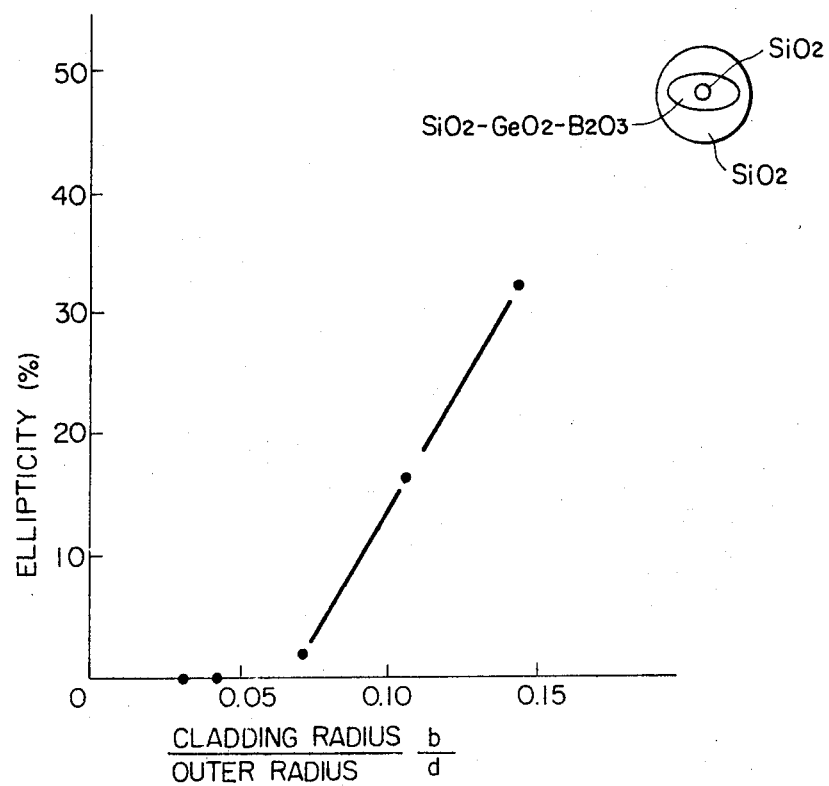

FIG. 14 shows numerically the ellipticity in the case where the ratio a/b in FIG. 13 is zero, that is, when the center consists solely of silica glass.

Figure 15:
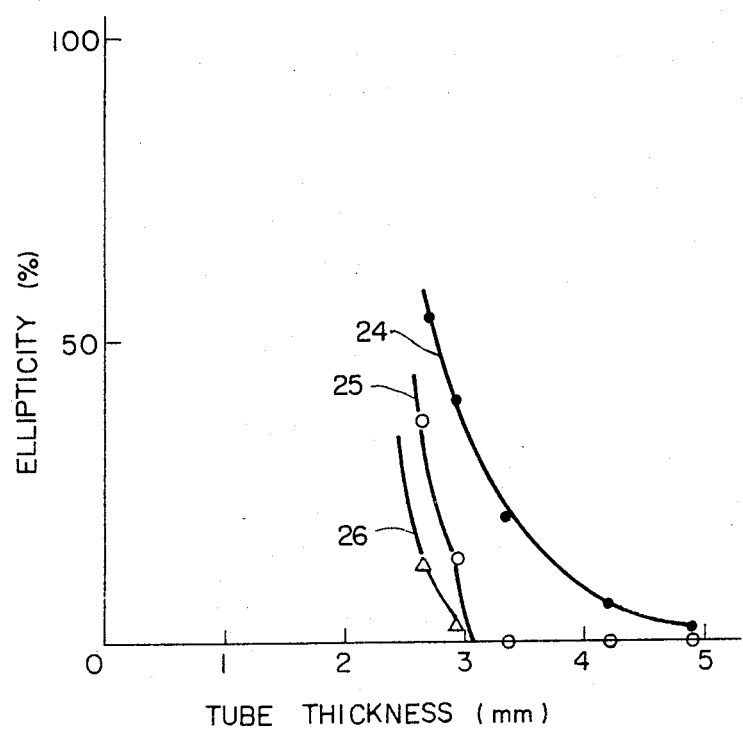
Figure 16:
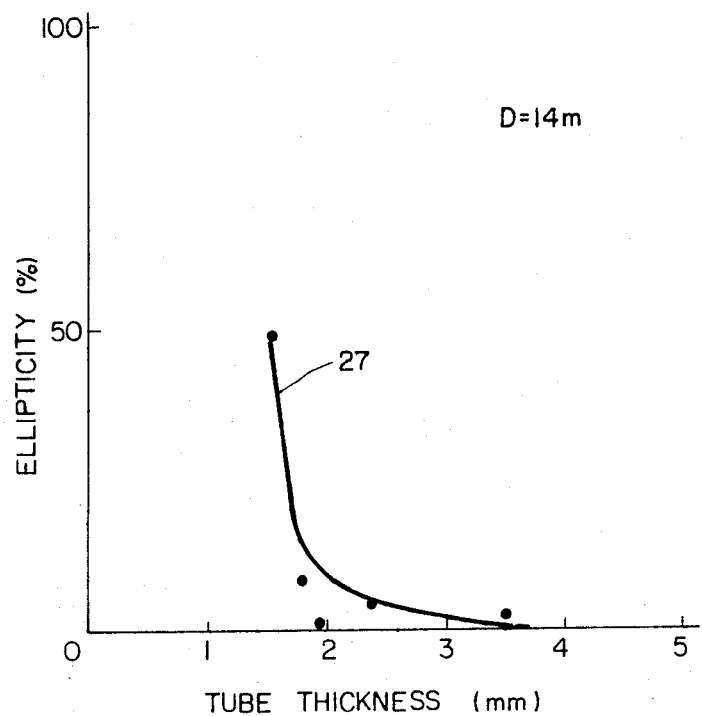

FIGS. 15 and 16 show the ellipticity (%) of each layer when the diameter D of the silica tube and the thickness W of the glass layer containing $B_2O_3$ are changed, before the formation of the preform. FIG. 15 shows the silica tube of the diameter D of 18 mmφ and curves 24, 25 and 25 represent the ellipticity of the silica glass layer 22 containing $B_2O_3$, the silica layer 20 containing $GeO_2$ and the silica layer 21, respectively. FIG. 16 shows the case where the tube has the diameter D of 14 mmφ and a curve 27 represents the ellipticity of the silica layer 20 containing $B_2O_3$.

Figure 17:
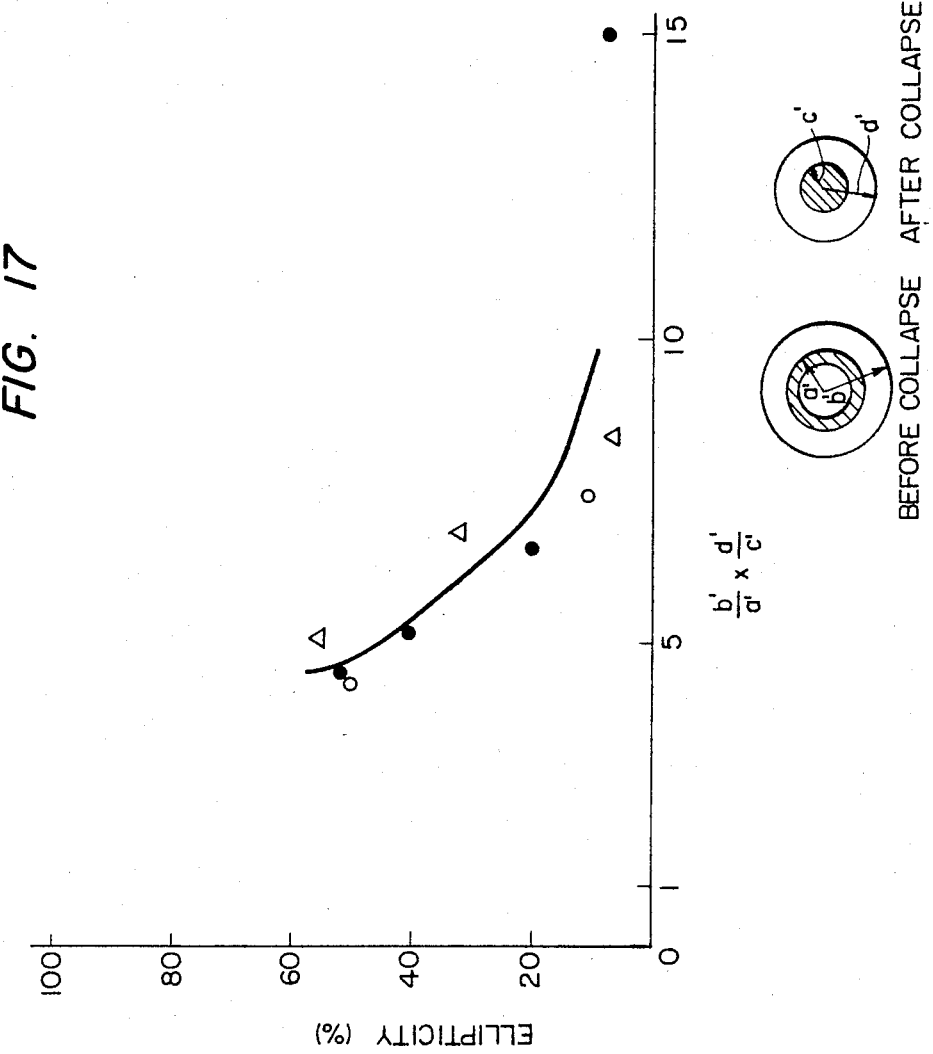

FIG. 17 shows the results of the abovementioned FIGS. 15 and 16 in a different manner. Namely, the abscissa represents a multiple $(b'/a') \times (d'/c')$ where b' and a' represent the outer diameter (b') and the inner diameter (a') of the silica tube before collapse and d' and c' are the outer diameter (d') and the inner diameter (c') of the silica tube after collapse, respectively, and the ordinate represents the ellipticity of the outer circumference of the $B_2O_3$-containing layer. In this drawing, marks ●, o and Δ represent the silica tube having the diameters of 18 mmφ, 14 mmφ and 20 mmφ, respectively. As can be understood from the drawing, the measuring points are positioned on the same curve. Accordingly, the ellipticity of the $B_2O_3$-containing layer 22 can be determined primarily by $(b'/a') \times (d'/c')$ irrespective of the size of the silica tube.

As described with reference to the foregoing embodiments, the present invention adds the step of reducing the pressure to the step of causing the collapse of the silica tube in the conventional production method which forms a dopant-containing glass layer inside the silica tube and then causing the glass layer to collapse. Thus, the present invention makes it possible to produce an optical fiber having a great birefringence, that is to say, an optical fiber capable of maintaining a linear polarization plane to a high extent, by suitably selecting the materials for the layers of the optical fiber. Further, the optical fiber of the embodiment shown in FIG. 12 can maintain the linear polarization plane but has small transmission loss so that it can be adapted practically to various optical devices.

What is claimed is:

1. An optical fiber having an optical waveguide and a jacket mounted on said waveguide, characterized in that said waveguide comprises a circular core and a circular cladding having a refractive index lower than that of said core, and said jacket consists of a first jacket having an elliptical outer shape and formed on said waveguide and a second jacket having a circular outer shape and formed on said first jacket.

2. The optical fiber according to claim 1 wherein the refractive index of said first jacket is not lower by 0.2% than that of said cladding.

3. The optical fiber according to claim 2 wherein said core consists of silica glass containing at least one of $GeO_2$ and $P_2O_3$, said cladding consists of silica glass and said first jacket consists of silica glass containing at least one of $GeO_2$ and $P_2O_5$, and $B_2O_3$.

4. A method of producing a preform rod for an optical fiber, comprising the steps of:
   (1) forming at least one glass layer on the inner wall of a glass tube, at least one of the glass layers being made of a glass material different from that of said glass tube;
   (2) heating and collapsing a part of said glass tube having said at least one glass layer formed thereon, wherein said part is collapsed to form a solid part; and thereafter (3) collapsing the portion of the glass tube not collapsed in step (2) into a solid preform rod by movement of heating means heating the glass tube from said part heated for collapsing in step (2) to the portion of said tube not collapsed in step (2), under the conditions that the glass tube is rotated at a predetermined speed and the internal pressure of said glass tube is lower than the pressure outside of said glass tube, said conditions being maintained from the time at which the heating means is first moved from said part heated for collapsing in step (2).

5. The method of producing the preform rod for an optical fiber according to claim 4 wherein the internal pressure in said step of collapsing said glass tube into a solid preform ranges from $-1$ mm to $-20$ mm in terms of water height.

6. The method of producing the preform rod for an optical fiber according to claim 4 wherein said step of forming said at least one glass layer of a glass material different from that of said glass tube on the inner wall of said glass tube comprises forming sequentially a first glass layer containing $B_2O_3$ and second and third glass layers on the inner wall of said glass tube in such a manner that when the thickness of said second and third glass layers are $t_2$ and $t_1$, the inner diameter $C'$ of said glass tube satisfies the following relations:

$t_1 + t_2 < 0.18 \ 1/C$, (mm), and $t_2/t_1 > 10.1$.

7. The method of forming the preformed rod for an optical fiber according to claim 4 wherein said movement of the heating means to the portion of said tube not collapsed in step (2) takes place in a single step.

8. A method of producing a preform rod for an optical fiber having a circular core, an elliptical intermediate layer and an outermost layer having a substantially circular surface, comprising the steps of:
(1) forming a plurality of glass layers on the inner wall of a glass tube, the innermost core layer of the glass layers being made of a glass material having a softening point higher than that of an intermediate layer between said glass tube and said innermost core layer, and said glass tube having a higher softening point than that of said intermediate layer;

(2) heating and collapsing a part of the glass tube having said plurality of glass layers formed thereon; and thereafter (3) collapsing the portion of the glass tube not collapsed in step (2) by movement of a heating means heating the glass tube from said part heated for collapsing in step (2) to the portion of said tube not collapsed in step (2), under the conditions that the glass tube is rotated at a predetermined speed and the internal pressure of said glass tube is lower than the pressure outside of said glass tube, whereby the core is formed to be circular and the glass tube has said substantially circular surface, and the intermediate layer becomes said elliptical intermediate layer.

9. The method of forming the preform rod for an optical fiber according to claim 8 wherein, in heating and collapsing a part of said glass tube, said part of said glass tube is collapsed to form a solid part.

10. The method of forming the preform rod for an optical fiber according to claim 8, wherein the glass tube is a silica glass tube, the intermediate glass layer is made of boron-doped silica glass, and the innermost layer is made of silica glass doped with at least one of germanium and phosphorus.

11. A method of producing a preform rod for an optical fiber, comprising the steps of:
(1) forming at least one glass layer on the inner wall of a glass tube, at least one of said glass layers being made of a glass material different from that of said glass tube;
(2) heating and collapsing a part of said glass tube having said at least one glass layer formed on the inner wall of the glass tube, wherein said part of said glass tube that is heated and collapsed is collapsed to form a solid part;
(3) reducing the radius of the portion of said glass tube having said at least one glass layer that is not collapsed in step (2) to form a shrunken glass tube by moving a heating portion under the condition that internal pressure of said glass tube is reduced relative to outside pressure; and
(4) inserting a rod into said shrunken glass tube, and collapsing the shrunken glass tube having the rod inserted therein to form a solid preform rod.

12. A method of producing a preform rod for an optical fiber according to claim 11, wherein at least one of the glass layers include a dopant of $B_2O_3$.

* * * * *